United States Patent [19]
Gute

[11] Patent Number: 5,560,669
[45] Date of Patent: Oct. 1, 1996

[54] FASTENERLESS RETAINER ASSEMBLY

[75] Inventor: Robert M. Gute, Corunna, Mich.

[73] Assignee: Lear Corporation, Southfield, Mich.

[21] Appl. No.: 288,346

[22] Filed: Aug. 10, 1994

[51] Int. Cl.⁶ .............................. B60J 3/00; F16B 13/04
[52] U.S. Cl. .................... 296/97.9; 248/222.12; 411/45; 411/344
[58] Field of Search ................. 296/97.1, 97.9; 248/278; 411/41, 45, 48, 340, 344, 345

[56] References Cited

U.S. PATENT DOCUMENTS

| | | |
|---|---|---|
| 4,178,035 | 12/1979 | Cziptschirsch . |
| 4,405,272 | 9/1983 | Wollar ...................... 411/45 X |
| 4,491,360 | 1/1985 | Fleming . |
| 4,804,303 | 2/1989 | Stratkus ...................... 411/48 X |
| 4,921,300 | 5/1990 | Lawassani et al. . |
| 4,989,911 | 2/1991 | Van Order . |
| 5,027,861 | 7/1991 | Gute . |
| 5,056,853 | 10/1991 | Van Order . |
| 5,061,005 | 10/1991 | Van Order et al. . |
| 5,082,322 | 1/1992 | Cekander et al. . |
| 5,107,890 | 4/1992 | Gute . |
| 5,358,299 | 10/1994 | Seto ........................ 296/97.9 |
| 5,370,484 | 12/1994 | Morikawa et al. ............ 411/48 |
| 5,397,088 | 3/1995 | White .................... 296/97.9 X |
| 5,411,310 | 5/1995 | Viertel et al. ............. 296/97.9 |

FOREIGN PATENT DOCUMENTS 3713425   11/1988   Germany ........................ 296/97.11

Primary Examiner—Joseph D. Pape
Attorney, Agent, or Firm—Brooks & Kushman P.C.

[57] ABSTRACT

A sun visor retainer assembly (10) adapted for attachment to a header opening (36) in a vehicle header (22) is disclosed. The retainer assembly (10) includes a housing and a retainer pin (46). The housing (44) has a main body (50) with a pin opening (55) therein and at least one flap (58) pivotally connected to the main body (50) by living hinge portion (56). The retaining pin (46) is insertable through the pin opening (53) to pivot the flap (58) into engagement with an outer surface (32) of the header (22) to clamp the flap (58) and the main body (50) against respective outer and inner surfaces (32,34) of the header (22).

20 Claims, 2 Drawing Sheets

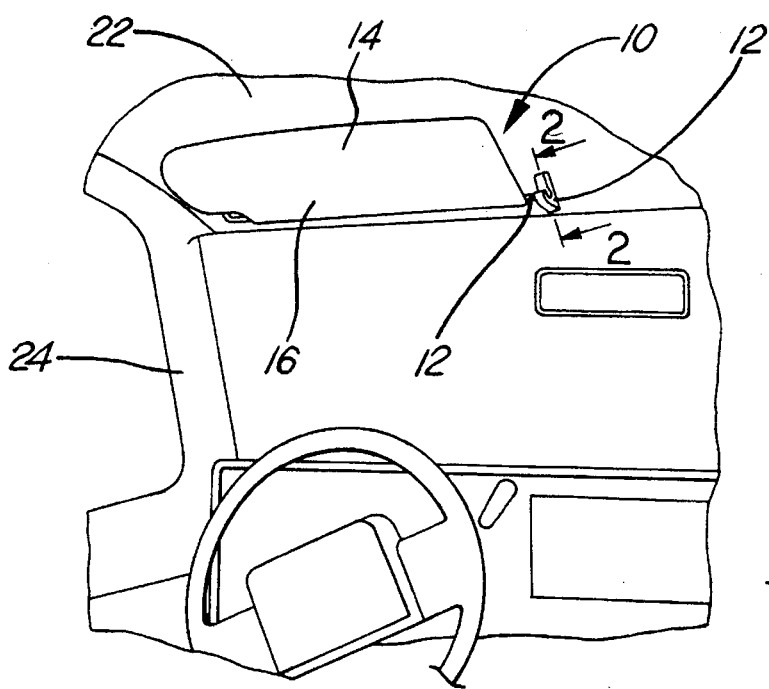
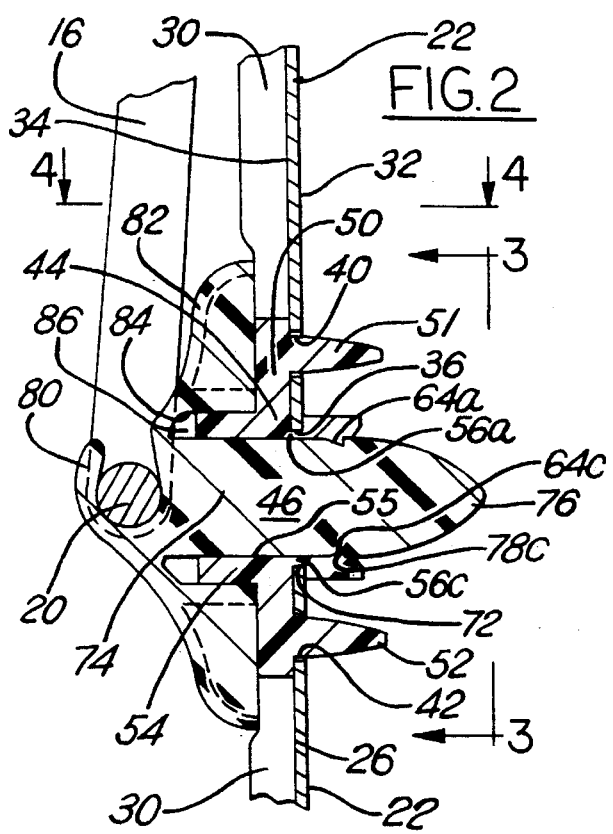
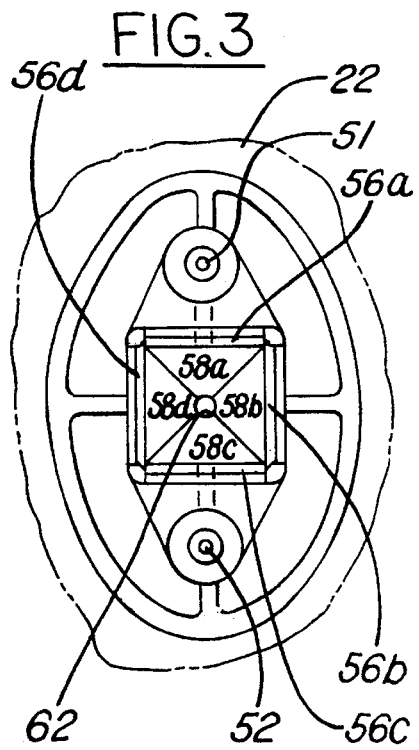
FIG. 1
FIG. 2
FIG. 3

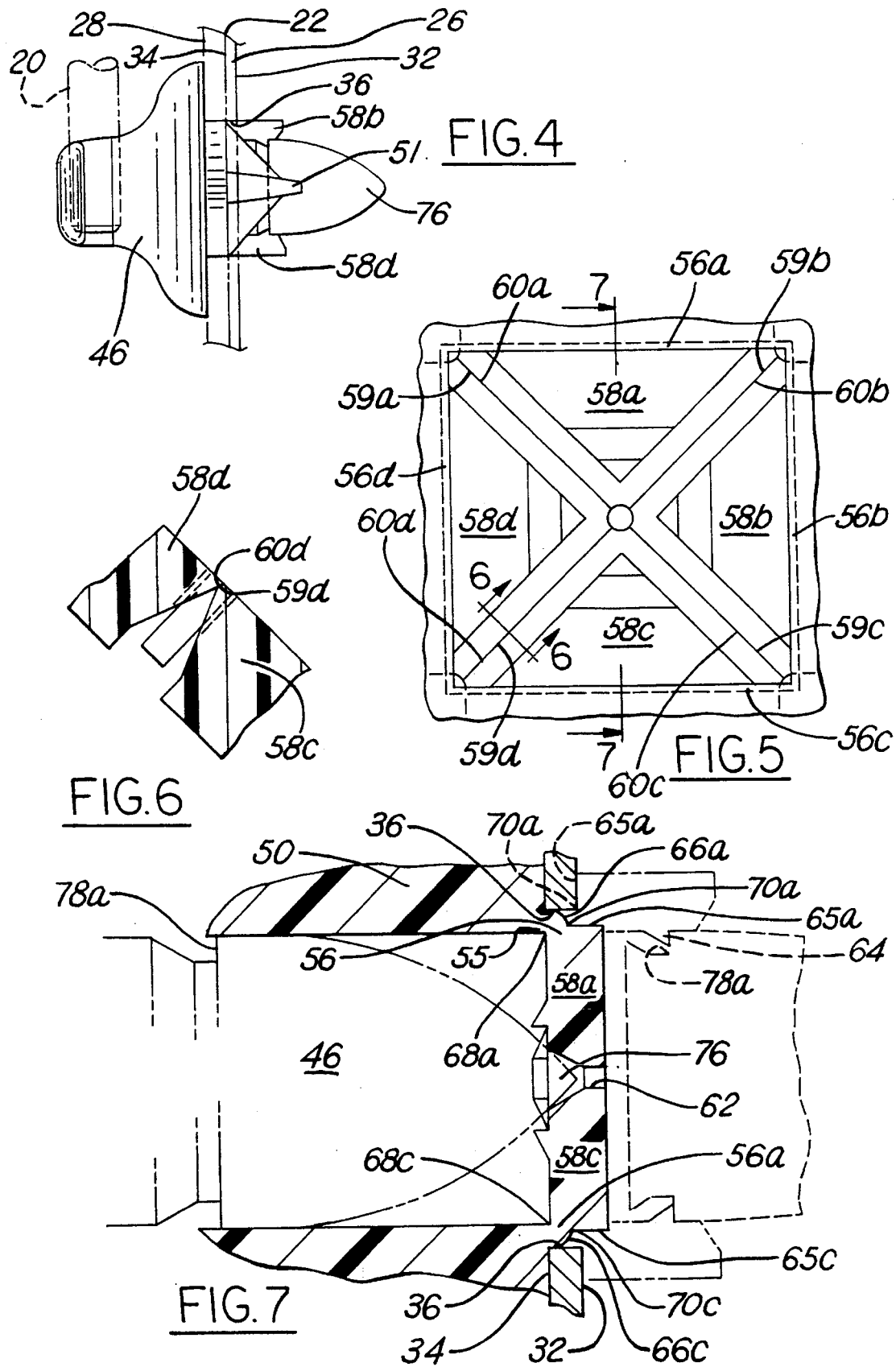

5,560,669

FASTENERLESS RETAINER ASSEMBLY

TECHNICAL FIELD

This invention relates generally to fastenerless retainer assemblies, and more particularly to retainer assemblies for attaching sun visors to headers of vehicles.

BACKGROUND ART

The mounting of sun visors to headers of vehicles can be costly and labor intensive. Designs have been made which eliminate metal fasteners, such as screws, to reduce the cost and time necessary to mount the sun visors within vehicles.

One such example is U.S. Pat. No. 4,178,035. An annular plug-in body has a plug-in pin at a leading free front end and a flange formed at the rear end. A continuous circumferentially extending groove, located intermediate the front and rear ends, snaps into and cooperates with a receiving hole in a header. The flange has a hollowed out, rounded shape to resiliently self-bias the body around the receiving hole to provide spring support of the plug-in body on the header. An L-shaped axle has a long arm supporting a visor body and a short arm with a terminal mushroom-shaped head. Beneath the head is a shank ending in an encircling shoulder. The head, the shank and the shoulder cooperate to support the body within the header.

However, this design has a number of shortcomings. First, the retention of the plug-in body relative to the header is flexible and does not solidly lock the plug-in body relative to the header. Second, the dimensions and their tolerances on the parts must be relatively tightly held or else the body will be loosely retained to the header. Third, it may be difficult to install the plug-in body within the header aperture as the head is circumferentially continuous and therefore stiff.

The present invention is intended to overcome the aforementioned problems in sun visor retainer assemblies for vehicles.

SUMMARY OF INVENTION

An object of the present invention is to provide a fastenerless retainer assembly for attaching a sun visor to a vehicle header wherein the retainer assembly does not require fasteners while solidly locking the retainer assembly to the header.

It is another object to provide a retainer assembly and method for utilizing the same which includes a retainer pin, to which a sun visor can be attached, which is used to pivot open at least one flap attached to a main body on a housing to clamp the housing to an opening in the header.

In carrying out the above objects and other objects of the invention, a sun visor retainer assembly is disclosed which is adapted for attachment to a vehicle header of a predetermined thickness having an outer surface and an inner surface with a header opening extending between the surfaces. The retainer assembly comprises a housing and retaining pin. The housing has main body with a pin opening therein and at least one flap pivotally connected to the main body by a living hinge portion. The flap of the main body is insertable through the header opening. The retaining pin is insertable through the pin opening to pivot the flap into engagement with the outer surface of the header to sandwich the flap and the main body against the respective outer and inner surfaces of the header. This ideally axially locks the housing to the header.

Preferably, the housing has a plurality of living hinge portions and flaps attached to the main body which pivot into clamping engagement with the header. Ideally, the living hinge portions are sufficiently short such that the pivoting of the flaps into engagement with the header stretches the living hinge portions causing the flaps and main body to clamp about the header.

A method is also disclosed for mounting a sun visor to a header. A housing is positioned in alignment with a header opening in a vehicle header of a predetermined thickness having inner and outer surfaces. The housing has a main body with a pin opening therein and at least one flap pivotally attached to the main body by a living hinge portion. The retainer pin is inserted through the pin opening in the housing with the flap pivoting about the header opening with the flap and main body of the housing sandwiching about the respective outer and inner surfaces of the header to attach the housing to the header. An end pin on the sun visor may then be attached to one of the housing or the retainer pin thereby attaching the sun visor to the header.

Preferably, a plurality of flaps connected by living hinge portions to the main body are pivoted into engagement with the header. Ideally, the living hinge portions are stretched to place a compressive load on the header between the flaps and the main body.

BRIEF DESCRIPTION OF THE DRAWINGS

These and other features, objects, and advantages of the present invention will become readily apparent from the following description, pending claims, and accompanying sheets of drawings where:

FIG. 1 is a perspective view of a retainer assembly, made in accordance with the present invention, securing the distal end of a sun visor to a header of a vehicle;

FIG. 2 is a fragmentary sectional view taken along line 2—2 of FIG. 1;

FIG. 3 is a view looking along line 3—3 of FIG. 2;

FIG. 4 is a fragmentary bottom view taken along line 4—4 of FIG. 2;

FIG. 5 is a fragmentary front view of flaps of a housing prior to having a retaining pin inserted through the housing;

FIG. 6 is a fragmentary sectional view taken along line 6—6 of FIG. 5; and

FIG. 7 is an enlarged fragmentary side view, partially in section, taking along line 7—7 of FIG. 6 showing, in full line, a retaining pin prior to being inserted into a housing, and in phantom line, showing the retaining pin inserted in the housing with flaps and a main body of the housing sandwiching about the vehicle header.

BEST MODE FOR CARRYING OUT THE INVENTION

A sun visor assembly 10, made in accordance with the present invention, is shown in FIG. 1. Sun visor assembly 10 includes a retainer assembly 12 to which a sun visor 14 is attached. Sun visor 14 includes a blade 16 which is secured upon a mounting rod 20. A distal end of mounting rod 20 is releasably held in retainer assembly 12 as will be further described below. Retainer assembly 12 is mounted to a header 22 inside of a vehicle 24.

Referring now to FIGS. 2–4, vehicle header 22 has a sheet metal portion 26 to which a cushioned liner 30 is attached. Sheet metal portion 26 has an outer surface 32 and an inner surface 34 with a square central header opening 36 and a pair of locator openings 40 and 42 extending therebetween.

Retainer assembly 12 includes a housing 44 and a flanged retainer pin 46 which extends through housing 44 to anchor retainer assembly 12 to header 22. Housing 44 has a main body 50 including a hub 54 and a pin opening 55 extending through hub 54. Locator pins 51 and 52 extend from main body 50 and are sized to be received within respective locator openings 40 and 42 of header 22 to position housing 44 relative to header 22.

As best seen in FIGS. 5—7, four plastic hinge portions 56a–d pivotally connect four flaps 58a–d to main body 50. Flaps 58a–d cover pin opening 55 prior to insertion of flanged retainer pin 46. Flaps 58a–d are generally triangularly shaped having beveled edges 59a–d and 60a–d with a circular aperture 62 being formed at their apexes. Initially flaps 58a–d are coplanar and are formed with respective edges 59a–d adjacent to edges 60a-d. Upon insertion of retainer pin 46, flaps 58a–d freely pivot with plastic hinge portions 56 relative to main body 50 to uncover pin opening 55, as shown in phantom in FIG. 7.

Flaps 58a–d each have inwardly opening triangularly shaped dogs 64a–d located thereon. Generally planar bearing surfaces 65a–d on flaps 58a–d initially extend generally parallel to pin opening 55. With the insertion of retainer 46, bearing surfaces 65a–d become perpendicular to opening 55 and bear against header 22.

Referring specifically now to FIG. 7, plastic hinge portions 56a–d initially have rounded outer portions 66a–d and perpendicular inner portions 68a–d. Step portions 70a–d are formed at the intersection of outer portions 66a–d and bearing surfaces 65a–d on flaps 58a–d. The length of plastic hinge portions 56a–d is preferably less than the thickness of sheet metal portion 26 or the distance between outer and inner surfaces 32 and 34.

When retainer pin 46 is inserted through pin opening 55, flaps 58a–d pivot upward and outward. Initially rounded outer portions 66a–d of flaps 58a–d then roll upon header opening 36 with living hinge 56a–d stretching sufficiently for steps 70a–d to abut and engage header opening 36 and outer surface 32 of sheet metal 26 of header 22. Outer portions 66a–d become planar against pin opening 36 and bearing surfaces 65a–d presses upon outer surface 32. Accordingly, main body 50, outer portions 66 and bearing surfaces 65a–d define a U-shaped groove which clampingly engages header 22. This locks housing 44 securely in position relative to header 22.

Looking now to FIG. 2, retainer pin 46 includes a square, elongated pin portion 74 which terminates in a nose 76. Receiving grooves 78a–d peripherally extend about the four sides of pin portion 74 and are adapted to interlock with retaining dogs 64a–d when retainer pin 46 is fully inserted through pin opening 55. Distal from nose 76 is a U-shaped clamp portion 80 into which the distal end portion of mounting rod 20 can be releasably snapped into and out of engagement.

A flange 82 is integrally joined to rectangular pin portion 74 and abuts header 22 compressibly contacting cushioned liner 30 when retainer pin 46 is installed. Flange 82 includes a peripherally extending undercut 84 which surrounds the outer periphery of hub 54 of main body 50. A gap is created between flange 82 and hub 54 to allow for the flexing of flange 82 relative to pin portion 74.

In operation, locator pins 51 and 52 are aligned with respective locator openings 40 and 42 in header 22. Locator pins 51 and 52 are then pressed into locator openings 40 and 42 to locate housing 44 with respect to header 22. At this point, flaps 60a–d are still coplanar with one another. Nose 76 of flanges retainer pin 46 is then positioned within circular aperture 62 defined by the flaps 58a–d. Flanged retainer pin 46 is next forced into circular aperture 62 with flaps 58a–d tearing apart and pivoting outwardly. Retainer pin 46 is pushed sufficiently inwardly such that the retaining dogs 64a–d snap into interlocking relationship with retaining grooves 78a–d of retainer pin 46, as shown in phantom lines in FIG. 7 and as shown in FIG 2.

Meanwhile, each of living hinge portions 56a–d fulcrum about and roll against header opening 36. This continues until living hinge portions 56a–d stretch sufficiently to allow step portions 70a–d to snap into engagement with header opening 36 and outer surface 32. Accordingly, housing 44 and flange retainer pin 46 are solidly attached to header 22. Flange 82 of retainer pin 46 can flex relative to pin portion 74 to accommodate the tolerances in the manufacture of housing 44 and retainer pin 46 by permitting relative axial movement between flange 82 and pin portion 74 due to the flexibility provided by undercut 84.

While the foregoing specification of this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principals of the invention.

For example, while the four flaps 58a–d have been described, as few as one pivotal flap and possible more than four flaps could be utilized in this invention. It should also be appreciated that this retainer assembly could be used to attach other components, such as coat hooks, to openings in vehicles. Further, the retainer assembly of this invention could be used to attach components to openings in walls in general.

What is claimed is:

1. A retainer assembly adapted for attaching to a vehicle header having an outer surface and an inner surface with a header opening extending between the outer and inner surfaces, the retainer assembly comprising:

a housing having a main body engageable with the inner surface and having a pin opening therein and at least one flap pivotally connected to the main body by a respective at least one living hinge portion, the at least one flap of the main body being insertable through the header opening; and a retaining pin insertable through the pin opening and header opening to pivot the at least one flap into engagement with the outer surface with the main body bearing against the inner surface and the living hinge portion being tensilely stretched to provide clamping engagement of the at least one flap and the main body about the respective outer and inner surfaces of the header to retain the housing to the vehicle header.

2. The retainer assembly of claim 1 wherein:

the at least one living hinge portion bears against the header opening when the retaining pin is inserted in the pin opening.

3. The retainer assembly of claim 1 wherein:

the at least one living hinge portion and the at least one flap generally extend across the pin opening prior to installation of the retaining pin in the pin opening and swing outwardly to extend generally perpendicular to the pin opening when the retaining pin is installed in the pin opening.

4. The retainer assembly of claim 2 wherein:

the at least one flap and the at least one living hinge portion includes four flaps and four living hinge portions.

5. The retainer assembly of claim 1 wherein:

the at least one living hinge portion is shorter in length than the predetermined thickness of the header whereby the at least one living hinge portion is tensilely stretched when the retainer assembly is mounted to the header.

6. The retainer assembly of claim 1 wherein:

the at least one flap includes at least two flaps and the at least two flaps are attached to one another prior to installation of the retaining pin and are torn apart upon installation of the retaining pin in the pin opening.

7. The retainer assembly of claim 1 wherein:

the at least one flap and the body each have generally planar bearing surfaces which clampingly bear against the inner and outer surfaces of the header when the retainer assembly is mounted to the header.

8. The assembly of claim 1 wherein:

the at least one flap has an interlocking surface; and the retaining pin has a flange and a pin portion having an interlocking surface, the flange engageable with the inner surface and the pin portion insertable through the pin opening with the interlocking surfaces of the pin portion and the at least one flap engageable with one another to retain the retaining pin within the housing.

9. The assembly of claim 8 wherein:

the pin portion and the flange have an undercut formed therebetween which allows the flange to flex relative to the pin portion.

10. The assembly of claim 1 wherein:

the at least one living hinge portion and the at least one flap define a step portion therebetween engageable with the header opening; and the length of the living hinge portion connecting the at least one flap to the main body is less than the predetermined thickness of the header so that when the step portion engages the header opening and outer surface, the at least one living hinge portion is tensilely stretched clamping the flap and the main body about the outer and inner surfaces of the header.

11. The assembly of claim 1 wherein:

the at least one living hinge portion includes a rounded portion which rolls upon the header opening, in response to the retainer pin being inserted into the pin opening, with the rounded portion rolling flat against the header opening as the at least one flap pivots into engagement with the outer surface of the header.

12. The assembly of claim 1 wherein:

the main body, the at least one living hinge portion and the at least one flap cooperate to form a U-shaped retaining groove having a pair of perpendicular corner portions which flushly bear against the header opening and inner and outer surfaces of the header.

13. The assembly of claim 1 wherein:

the housing includes at least one locator pin, the at least one locator pin being insertable within a locator opening in the header to locate the housing relative to the header.

14. A method of mounting a sun visor to a header having inner and outer surfaces, the method comprising:

positioning a housing against the inner surface in alignment with a header opening in the header, the housing having a main body with a pin opening therein and at least one flap pivotally attached to the main body by at least one living hinge portion;

inserting a retainer pin through the pin opening in the housing with the at least one flap pivoting about the header opening and tensilely stretching the at least one living hinge portion with the at least one flap and main body of the housing clamping about the respective outer and inner surfaces of the header to attach the housing to the header; and attaching a sun visor to one of the housing and the retainer pin.

15. The method of claim 14 wherein:

inserting the retainer pin through the pin opening includes interlocking the retainer pin with the at least one flap to prevent withdrawal of the retainer pin from the housing.

16. The method of claim 14 wherein:

positioning the housing includes inserting a locator pin on the main body into a locator opening in the header to align the housing relative to the header.

17. The method of claim 14 wherein:

the at least one flap and the at least one living hinge portion includes a plurality of living hinge portions and a plurality of flaps, the flaps being initially connected together; and the insertion of the retaining pin causes the plurality of flaps to tear apart from each other and pivot into clamping engagement with the header sandwiching the inner and outer surfaces of the header between the main body and the flaps.

18. The method of claim 14 wherein:

the at least one living hinge portion and the at least one flap cooperate to form a generally perpendicular corner; and the insertion of the retainer pin in the pin opening causes the living hinge portion to be stretched with the corner flushly mating with the header opening and outer surface.

19. A retainer assembly adapted for attachment to a wall of a predetermined thickness having an outer surface and an inner surface with a wall opening extending between the surfaces, the retainer assembly comprising:

a housing having a main body with a pin opening therein and a flange, at least one flap pivotally connected to the main body by at least one living hinge portion, the at least one flap of the main body being insertable through said wall opening; and a retaining pin insertable through the pin opening to pivot the at least one flap into engagement with the outer surface of the wall and tensilely stretching the at least one living hinge portion to clamp the at least one flap and the flange against the respective outer and inner surfaces of the wall.

20. The assembly of claim 19 wherein:

the living hinge portion and the flap define a step portion therebetween engageable with the wall opening; and the length of the at least one living hinge portion connecting the at least one flap to the main body is less than the predetermined thickness of the wall so that when the step portion engages the header opening and outer surface, the at least one living hinge portion is tensilely stretched clamping the flap and the flange against the Outer and inner surfaces of the header.

* * * * *